United States Patent [19]
Prowse

[11] Patent Number: 6,125,492
[45] Date of Patent: Oct. 3, 2000

[54] AUTOMATIC SWIMMING POOL CLEANING DEVICE

[75] Inventor: Gary Craig Prowse, Kingsley, Australia

[73] Assignee: Summer Moon Pty Ltd, Australia

[21] Appl. No.: 09/184,920

[22] Filed: Nov. 2, 1998

[30] Foreign Application Priority Data

Nov. 3, 1997 [AU] Australia .................................. PP0158
Jul. 13, 1998 [AU] Australia .................................. PP4629

[51] Int. Cl.[7] ........................................................ E04H 4/16
[52] U.S. Cl. ................................ 15/1.7; 137/843; 137/851
[58] Field of Search ................................ 15/1.7; 239/101; 137/493, 624.14, 843, 846, 851, 854; 251/5; 210/169

[56] References Cited

U.S. PATENT DOCUMENTS

| | | | |
|---|---|---|---|
| 3,008,160 | 11/1961 | West | 15/1.7 |
| 4,023,227 | 5/1977 | Chauvier | 15/1.7 |
| 4,208,752 | 6/1980 | Hofmann | 15/1.7 |
| 4,351,077 | 9/1982 | Hofmann | 15/1.7 |
| 4,642,833 | 2/1987 | Stoltz et al. . | |
| 4,742,593 | 5/1988 | Kallenbach . | |
| 4,769,867 | 9/1988 | Stoltz . | |
| 5,014,382 | 5/1991 | Kallenbach | 15/1.7 |
| 5,033,148 | 7/1991 | Chauvier et al. . | |
| 5,384,928 | 1/1995 | Khoury . | |
| 5,655,246 | 8/1997 | Chang . | |
| 5,902,175 | 5/1999 | De Goede et al. | 15/1.7 |

FOREIGN PATENT DOCUMENTS

| | | |
|---|---|---|
| 28111/77 | 3/1979 | Australia . |
| 40 510/78 | 4/1980 | Australia . |
| 559477A1 | 9/1993 | European Pat. Off. . |
| 745744A1 | 4/1996 | European Pat. Off. . |
| 2182551 | 11/1985 | United Kingdom . |
| WO 97/32096 | 9/1997 | WIPO . |

*Primary Examiner*—Randall E. Chin
*Attorney, Agent, or Firm*—Michael Best & Friedrich LLP

[57] ABSTRACT

An automatic swimming pool cleaning device (10) includes a flexible cleaning member (12) which is designed to contact an underwater surface of the swimming pool. A tube (14) is coupled to the cleaning member (12) for connecting the cleaning device (10) to a water vacuum hose via hose adaptor (19). Water and pool surface contamination is drawn from underneath the cleaning member (12) up through the tube (14) by suction to a water filter system before being returned to the pool. A flexible valve member (20) is mounted proximate a throat region (22) of the tube (14) wherein as water is drawn up through the tube (14) a decrease in pressure in the throat region (22) causes the valve member (20) to flex and momentarily interrupt the flow of water. The interruption to the flow of water through the tube (14) results in a momentary differential of ambient pressure underneath the flexible cleaning member (12) which enables the device (10) to move forwards incrementally along the underwater surface of the pool. A significant advantage of the cleaning device (10) is that the valve assembly includes only one moving part, flexible valve member (20), which is of simple design, low-wearing and thus low-maintenance.

8 Claims, 5 Drawing Sheets

AUTOMATIC SWIMMING POOL CLEANING DEVICE

FIELD OF THE INVENTION

The present invention relates to an automatic swimming pool cleaning device that when coupled to a water vacuum hose and water filter pump is capable of travelling over and cleaning an underwater surface of the pool.

BACKGROUND TO THE INVENTION

A variety of swimming pool cleaning devices have been designed in the past for automatically travelling over and cleaning the bottom and side surfaces of a swimming pool. This type of cleaner operates on the reduced pressure (suction) caused by a pump which induces a flow of water from the pool through a filtration system and back into the pool. Some of these devices travel under water by producing a pulsatile interruption of the flow of water through the cleaner using a special valve assembly. For example, Australian Patent No. 502,993 describes an underwater suction cleaner having a balanced operating head with an oscillatable valve adapted to close a pair of flow passages extending through the head from the inlet to an outlet. The valve is of substantially triangular cross-section so that it can pivot about its apex adjacent the outlet. A baffle plate causes one of the flow passages to be more restricted and less direct between the inlet and the outlet than the other. The valve is shaped so that liquid flowing through the passages causes automatic oscillation of the valve between first and second positions in which one of the flow passages through the head is closed.

Most of these prior art cleaning devices have not proved to be entirely satisfactory due to either too many moving parts or an imbalance in the basic design of the device. These problems can result in premature break-down, excessive wear of certain parts, entanglement of the vacuum hose or immobilisation of the device when it encounters a corner or other obstruction in the pool.

SUMMARY OF THE INVENTION

The present invention was developed with a view to providing an improved automatic swimming pool cleaning device which has a minimum number of moving parts and is less susceptible to at least some of the disadvantages noted above.

According to the present invention there is provided an automatic swimming pool cleaning device for use with a water vacuum and filter system, the device comprising:

a flexible cleaning member adapted to contact an underwater surface of the pool;

a tube mechanically coupled to the cleaning member and adapted to be connected to a water vacuum hose wherein water and pool surface contamination will be drawn by suction from underneath said cleaning member through the tube to the water filter system before being returned to the pool; and, a flexible valve member mounted proximate a throat region of said tube wherein as water is drawn through the tube a change in pressure in said throat region causes the valve member to flex and momentarily interrupt the flow of water whereby, in use, a resulting momentary differential of ambient pressure underneath said flexible cleaning member enables the device to move forwards along said underwater surface of the pool.

Preferably said throat region is provided with a hydrofoil section so that as water flows through the throat region it is accelerated, whereby a decrease in pressure is produced that causes the valve member to flex and move towards the hydrofoil section so as to momentarily interrupt the flow of water.

Typically said flexible valve member is in the form of an elongate strap mounted longitudinally in the throat region of the tube facing said hydrofoil section and lying substantially parallel to the normal flow of water through the tube. Advantageously said elongate strap is pivotally mounted at one end and fixed at the other end. Preferably said elongate strap is mounted with a degree of side clearance in the throat region so that debris can bypass the flexible valve member without jamming the strap.

According to another aspect of the present invention there is provided a flow regulator valve assembly for controlling the flow of water generated by a suction pump through an automatic swimming pool cleaning device, the valve assembly comprising:

a primary valve which is manually adjustable to set a desired flow rate of water through the pool cleaning device; and, a secondary valve which automatically opens in the event that the flow of water through the pool cleaning device is obstructed whereby, in use, the possibility of damage to the suction pump is minimised.

Typically said primary valve includes a manually rotatable collar rotatably mounted on a cylindrical valve body, the valve body having a first aperture which can be fully opened or fully closed by said collar, depending on the angular position of the collar relative to the valve body. Preferably a circumferential edge of the collar is shaped so as to permit the first aperture to be partially closed to varying degrees between the fully opened and fully closed position.

Typically said second valve is a pivotally mounted flap valve which is biased to a normally closed position in which it fully closes a second aperture provided in the valve body. Typically said flap valve is pivotally mounted about a fulcrum and has a lever arm extending from the fulcrum away from a flap connected to the fulcrum, the lever arm having a spring connected to a free end thereof to bias the flap to the normally closed position. Advantageously said first aperture and said second aperture are adjacent to, and communicate with, each other.

BRIEF DESCRIPTION OF THE DRAWINGS

In order to facilitate a more detailed understanding of the nature of the present invention, a preferred embodiment of the automatic swimming pool cleaning device will now be described in detail, by way of example only, with reference to the accompanying drawings, in which.

DETAILED DESCRIPTION OF PREFERRED EMBODIMENTS

Figures 1, 2, 3:
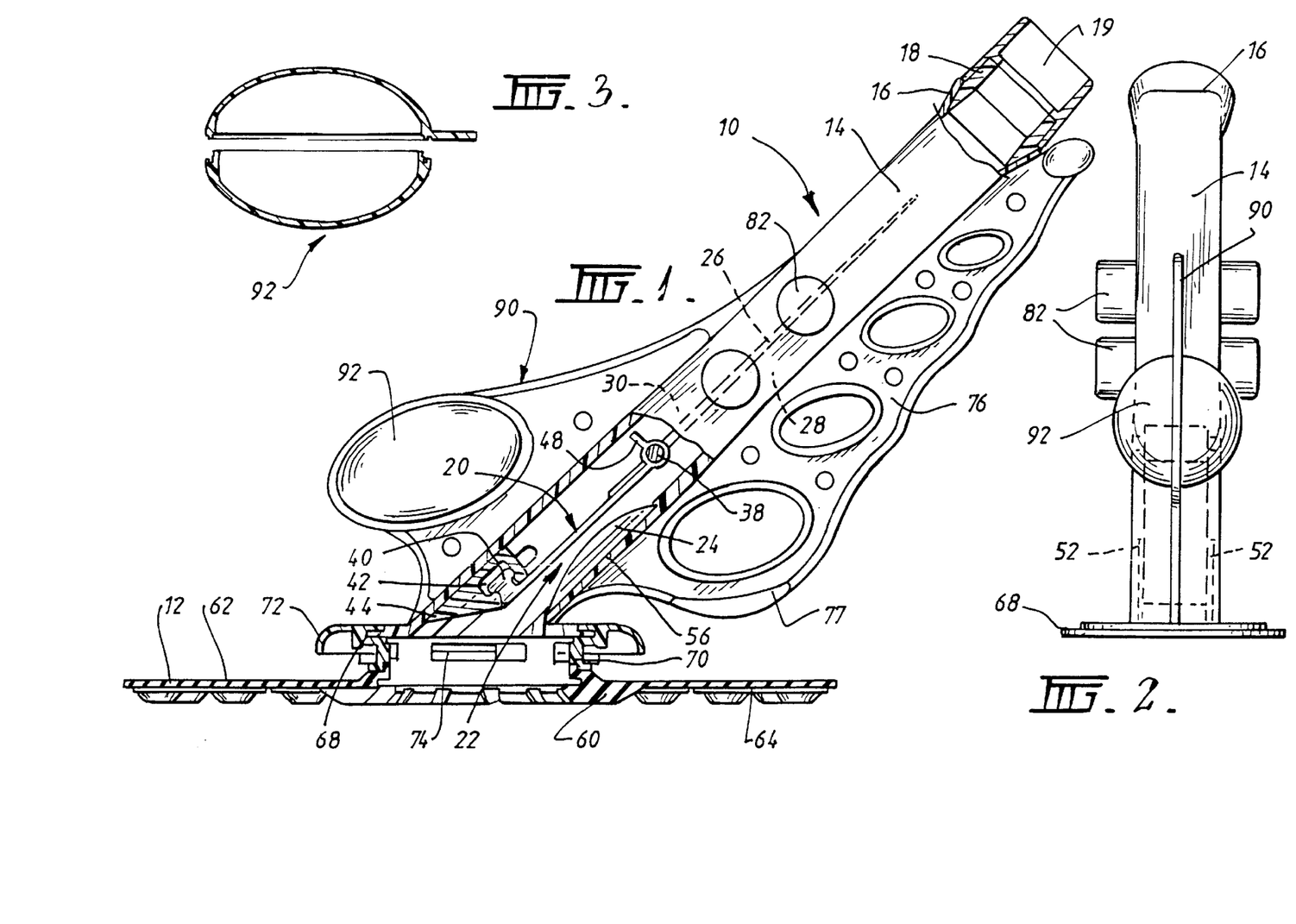
FIG. 1 is a side view of a preferred embodiment of the automatic swimming pool cleaning device in accordance with the invention.
FIG. 2 is an end view of the pool cleaning device of FIG. 1 with the flexible cleaning member removed.
FIG. 3 is an exploded section view of a buoyancy bulb employed in the pool cleaning device of FIG. 1.

A preferred embodiment of the automatic swimming pool cleaning device 10 as shown in FIG. 1 comprises a flexible cleaning member 12 which is adapted to contact an underwater surface of a swimming pool (not shown). A tube 14 is mechanically coupled to the cleaning member 12 and is adapted to be connected to a water vacuum hose (not shown). As can be seen most clearly in FIG. 2, the tube 14 is of substantially rectangular cross-section and is formed with a mouth 16 of substantially circular cross-section which is designed to receive a hose swivel 18 (see FIG. 1) therein. A hose adaptor 19 is rotatably connected to the hose swivel 18 for connecting the pool cleaning device to the water vacuum hose. The water vacuum hose, which is connected to a water vacuum and filter system (not shown), can be connected to the hose swivel 18 so that, in use, water and pool surface contamination will be drawn from underneath the cleaning member 12 up through the tube 14 by suction to the water filter system before being returned to the pool. The hose swivel 18 eliminates torsional twisting of the vacuum hose which would otherwise be caused by continual rotating of the device 10 during normal operation.

A flexible valve member 20 is mounted proximate a throat region 22 of the tube 14 wherein as water is drawn up through the tube 14 a decrease in pressure in the throat region 22 causes the valve member 20 to flex and momentarily interrupt the flow of water. The interruption to the flow of water through the tube 14 results in a momentary differential of ambient pressure underneath the flexible cleaning member 12 which enables the device 10 to move forwards incrementally along the underwater surface of the pool. When valve member 20 momentarily closes, water surges in tube 14 producing an hydraulic "hammer" action in the water vacuum hose. The suction under the flexible cleaning member 12 is simultaneously reduced allowing the device 10 to move forwards. The structure and arrangement of the flexible valve member 20 will be described in more detail below with reference to FIGS. 3 and 4.

The throat region 22 of the tube is preferably provided with a hydrofoil section, which in this embodiment takes the form of a removable hydrofoil section 24, so that as water flows through the throat region 22 it is accelerated. This acceleration of the flow produces a decrease in water pressure that causes the valve member 20 to flex and move towards the hydrofoil section 24 so as to momentarily interrupt the flow of water.

The tube 14 is divided into two sections by a dividing wall 26, namely, a primary flow chamber 28 and a secondary chamber 30. The flexible valve member 20 effectively forms an extension of the dividing wall 26 down to the throat region 22 of the tube 14. Most of the water drawn up into the tube 14 through throat region 22 flows through the primary flow chamber 28. However, as noted above, the decrease in pressure caused by hydrofoil section 24 results in a flexing of valve member 20 and a momentary interruption of the flow of water through the primary flow chamber 28. This momentary interruption of the flow of water through the primary flow chamber 28 causes a decrease in pressure in the secondary chamber 30 (due to suction of the vacuum hose), which causes the valve member 20 to return to an open position as shown in FIG. 1. It is estimated that the flexible valve member 20 oscillates between the open and interrupt positions approximately 260–280 times per minute.

Figure 4:
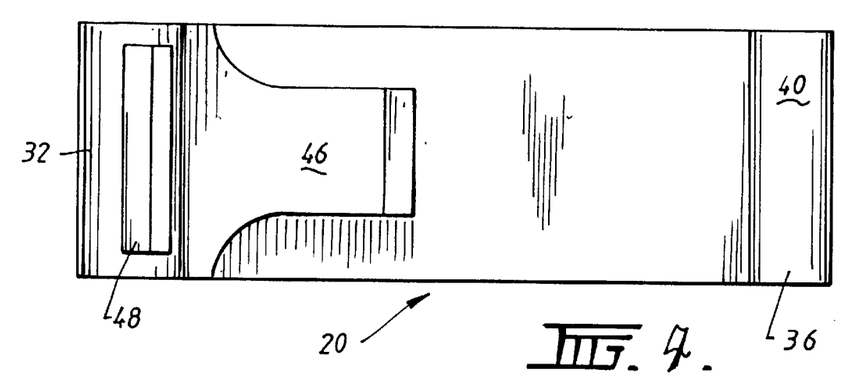
FIGS. 4 and 5 are enlarged views of a flexible valve member employed in the pool cleaning device of FIG. 1.

As can be seen more clearly in FIGS. 3 and 4, the flexible valve member 20 is in the form of an elongate strap which is moulded in one piece from a flexible, resilient material such as rubber. The strap is approximately 3 mm in thickness throughout its length and is designed to be pivotally mounted at a first end 32 and fixed at the other end 34. For this purpose, the end 32 is provided with a pivot pin 38 which is mounted in the walls of the tube 14 (see FIGS. 1 and 2). The other end 34 of the strap 20 is formed with a tongue 40 which is received in close fitting relation within a groove 42 formed within a restrictor 44 (see FIG. 1). Restrictor 44 is slidably received within the throat region 22 of the tube 14 and its position can be adjusted to locate the valve member 20 so that there is no tension or slack in the strap 20. The rubber strap 20 varies in width from a minimum of approximately 36 mm at the first end 32 to a maximum width of approximately 38 mm at the other end 34. A reinforcing rib 46 is provided adjacent the first end 32 to add stiffness and strengthen the strap in the region of maximum flexing. The first end 32 is also formed with a restrictor 48 which reduces the rate that water can flow through the secondary chamber 30 to return the valve member 20 to the open position, and this regulates the time that the valve member will remain in the interrupt position In the interrupt position, the valve member may or may not fully close the primary flow chamber 28.

The flexible valve member 20, including the restrictor 48, effectively provide the power to motivate the pool cleaning device 10 by utilising the energy from the water flow. These components are fine-tuned to produce a self-start with the commencement of water flow through tube 14 produced by the water filter pump. At rest the valve member 20 is in a mid-way position as shown in FIG. 1, allowing rapid flooding of the primary and secondary chambers of tube 14 as well as the vacuum hose when initially inserting the device in the pool. This single open action valve requires a low flow rate of water to actuate the valve member. Furthermore, the valve is tuned to operate with side clearance between the strap 20 and the side walls of tube 14 so that debris may pass around the sides of the valve member without jamming the strap as it can flex about its longitudinal axis allowing an increased bypass to occur. The side clearance also dramatically reduces wear on the rubber strap as the section of the strap which flexes does not come into contact with the tube 14.

Figures 5, 6A:
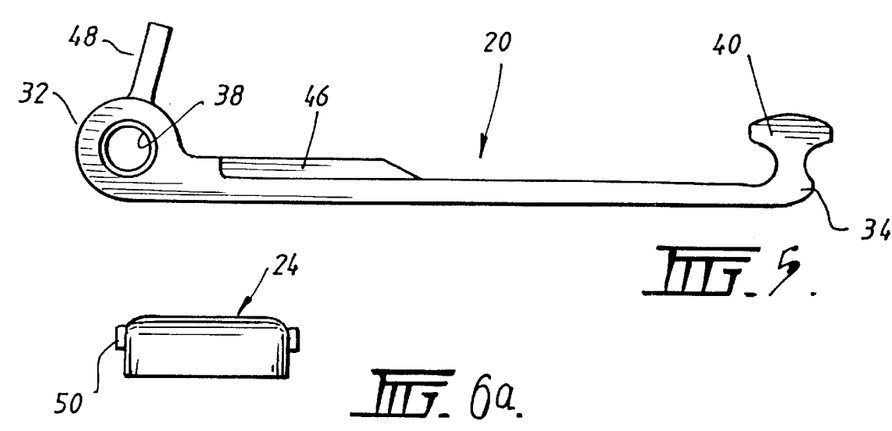
FIGS. 6a, 6b and 6c are enlarged views of a hydrofoil section employed in the pool cleaning device of FIG. 1.
Figures 6B, 6C:
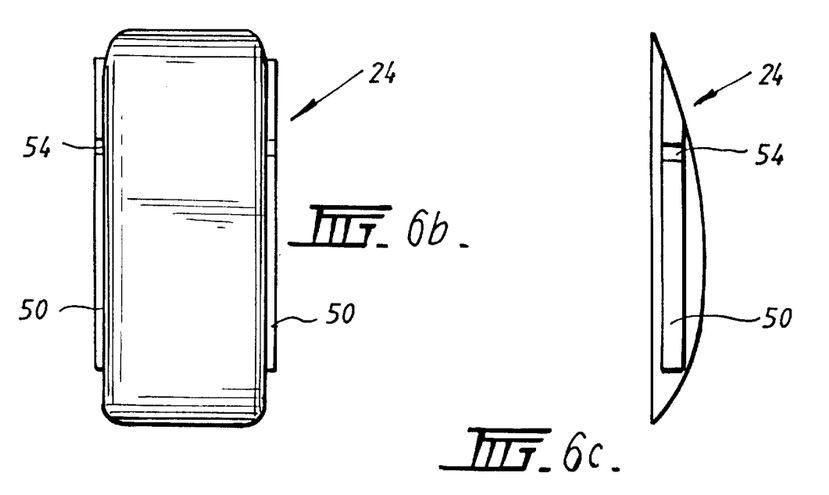

In this embodiment the hydrofoil section within the throat region 22 of tube 14 is formed by a removable hydrofoil section 24 as illustrated more clearly in FIGS. 6a, 6b and 6c. The hydrofoil section 24 is provided with a profile designed to produce the desired acceleration of water flow in the region adjacent the flexible valve member 20. The hydrofoil section 24 is provided with ribs 50 which are slidably received in corresponding grooves 52 provided in a wall of the tube 14 (see FIG. 2). Two small protrusions 54 provided on each side of the section 24 are received in corresponding indentations 56 provided in the side walls of tube 14 to hold the hydrofoil section in place in use. In this way, the hydrofoil section 24 can be easily removed for cleaning, replacement or fine-tuning of the pool cleaning device 10.

Figure 7:
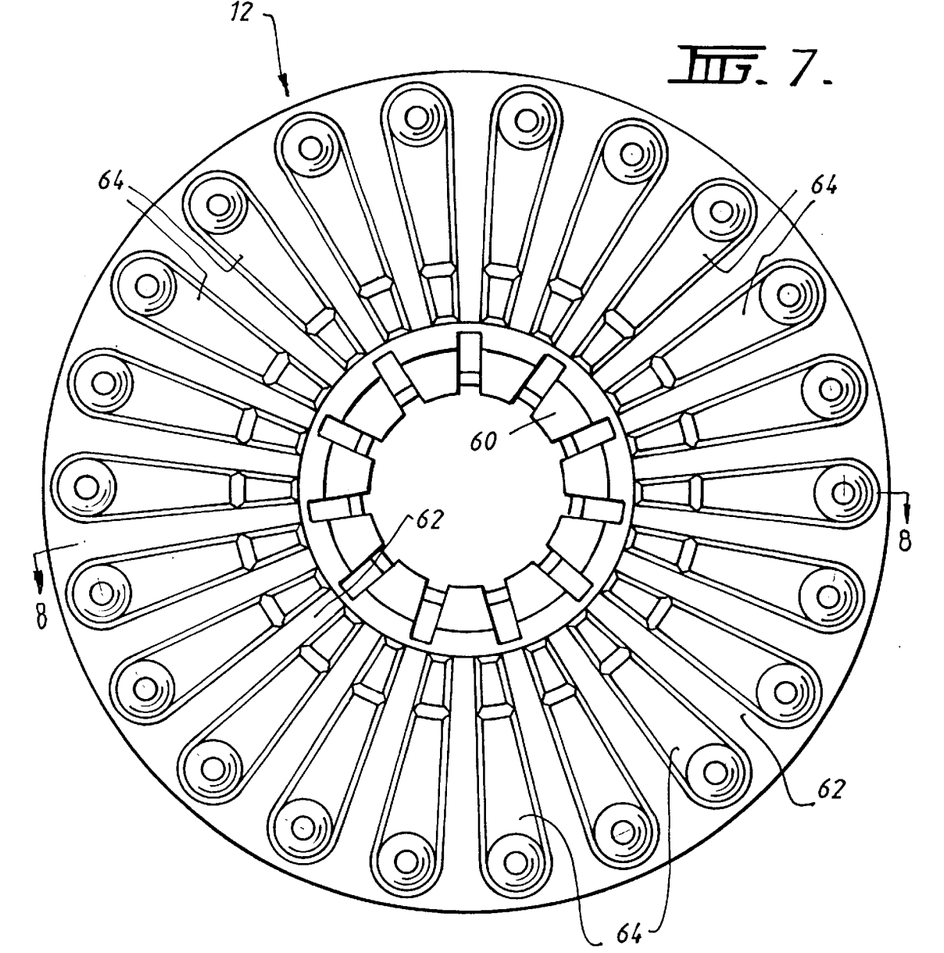
FIG. 7 is a bottom plan view of the flexible cleaning member employed in the pool cleaning device of FIG. 1.
Figure 8:
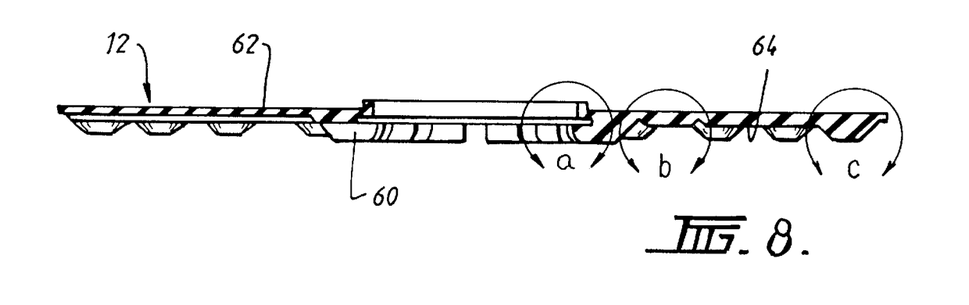
FIG. 8 is a section view through the flexible cleaning member of FIG. 7.
Figure 9:
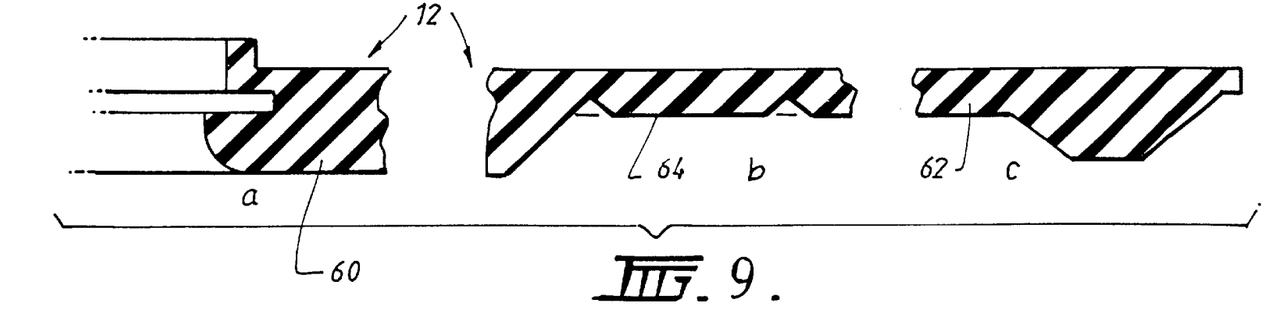
FIG. 9 illustrates several enlarged details of the flexible cleaning member as shown in FIG. 8.

The flexible cleaning member 12 of the device 10 is of substantially circular configuration as shown in FIG. 7 and comprises a sole 60 and a skirt 62 moulded in one piece from a flexible resilient material such as rubber. The skirt 62 is of generally thinner cross-section than the sole 60 which allows the cleaning member to provide a continuous drive and soft contact with the underwater pool surface, while at the same time hugging the various contours of the pool. Radially extending cavities 64 moulded into the underside of the sole 60 and skirt 62 allow constantly reduced pressure which prevents debris from being blown away from the skirt 62 and thus eliminates mixing of soluble deposits with the water which may cause cloudiness. The cavities 64 also enable the skirt 62 to pulsate around the edges generating a scrubbing action to loosen sand, grit, leaves and any other contamination on the bottom or side surfaces of the pool.

The flexible cleaning disc 12 is coupled to a base plate 68 (see FIG. 2) of tube 14 by means of a base ring swivel 70 and swivel disc 72 (see FIG. 1). The base ring swivel 70 is fixed to the top of the cleaning disc 12 in the region of the sole 60 and provides a solid base swivel for the base plate 68 to locate into. The swivel disc 72 is seated on top of the base plate 68 and clips onto the base ring swivel 70 in order to rotatably couple the tube 14 to the cleaning disc 12. The swivel disc 72 overhangs the base ring swivel 70 and a plurality of slots in an undersurface thereof allows debris to be drawn from the top surface of the skirt 62 into the tube 14, and also acts as a deflector. Slots 74 provided in the base ring swivel 70 facilitate the required reduction of suction between the sole 60 of the cleaning disc and the pool surface, thus regulating the forward movement of the device 10 with each oscillating action of the flexible valve member 20. Fine-tuning is achieved with by-pass holes that cause leakage around the base ring swivel 70, which reduces the suction and enhances its ability to rotate easily when operating. This also allows the base plate 68 of tube 14 to rotate when climbing vertical surfaces or when cornered against steps or other obstructions on the pool surface. Sufficient suction remains to prevent rotation when travelling across the bottom surface of the pool.

The swivel connection of the tube 14 to the cleaning disc 12 allows rotation of the tube 14 relative to the cleaning disc due to surging of the suction hose, and thereby change the thrust vector to free the machine if it tends to become stuck in any position. This is often not possible with existing cleaners due to suction problems that have not been completely overcome.

Figure 10:
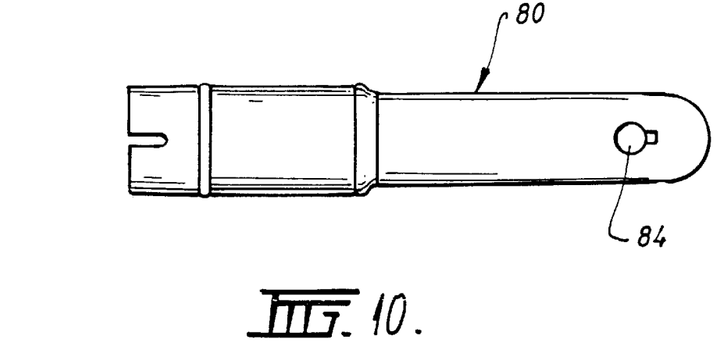
FIG. 10 illustrates a deflector arm for the pool cleaning device of FIG. 1.
Figure 11:
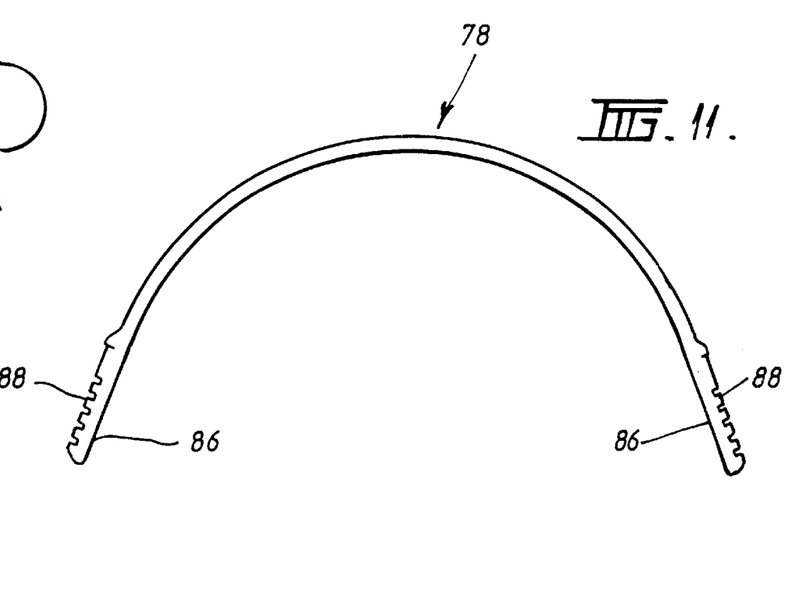
FIG. 11 illustrates a deflector for the pool cleaning device of FIG. 1.

A quantity of lead ballast may be accommodated within the base ring swivel 70 to assist in weight and balance as the device 10 must be correctly balanced in the water. A ballast deflector 76 also has a lead ballast 77 provided thereon. The pool cleaning device 10 is provided with a step deflector 78 (not shown in FIG. 1 or 2), as illustrated in FIG. 11. Deflector 78 is in the form of a semi-rigid elongate member, which is of semi-circular shape and mounted in respective deflector arms 80 provided on each side of the tube 14 of the pool cleaning device 10. Each deflector arm 80, as illustrated in FIG. 10, is received in a respective stub 82 provided on tube 14, which are most clearly visible in FIG. 2. A hole 84 provided adjacent the free end of each deflector arm 80 receives a respective end 86 of the deflector 78 therein. During assembly step deflector 78 is preferably bent slightly in order to insert the ends 86 in holes 84, and its natural resilience helps to retain the deflector 78 in the deflector arms 80. Detents 88 provided in the free ends 86 lock the deflector 78 in position.

The pool cleaning device 10 as shown in FIG. 1, is also provided with a buoyancy deflector 90 attached to the tube 14. Buoyancy deflector 90 has a buoyancy bulb 92 provided therein. FIG. 3 illustrates the buoyancy bulb 92 in an exploded section view. In this embodiment, the buoyancy bulb 92 is egg-shaped and is formed in two halves which fit together with an air tight seal. The interior of the bulb may be filled with air and/or foamed plastics material as required to give the desired degree of buoyancy.

The ballast deflector 76, step deflector 78, and buoyancy deflector 90 are all designed to keep the cleaning device 10 in the upright position on the underwater surface. Hence, if the device should become dislodged, or when initially dropped in the water, the built-in deflectors, ballast and buoyancy will cause it to roll onto the sole 60 of the cleaning disc, putting it into an upright position. When climbing a side wall of the pool, the buoyancy in deflector 90, and ballast in deflectors 76 and 78 will cause the device to rotate and return to the bottom of the pool. This action eliminates crossing and tangling of the suction hose. Due to the incorporation of the above-described ballast and buoyancy, the device needs no additional ballast, such as hose weights.

Figures 12, 13, 14:
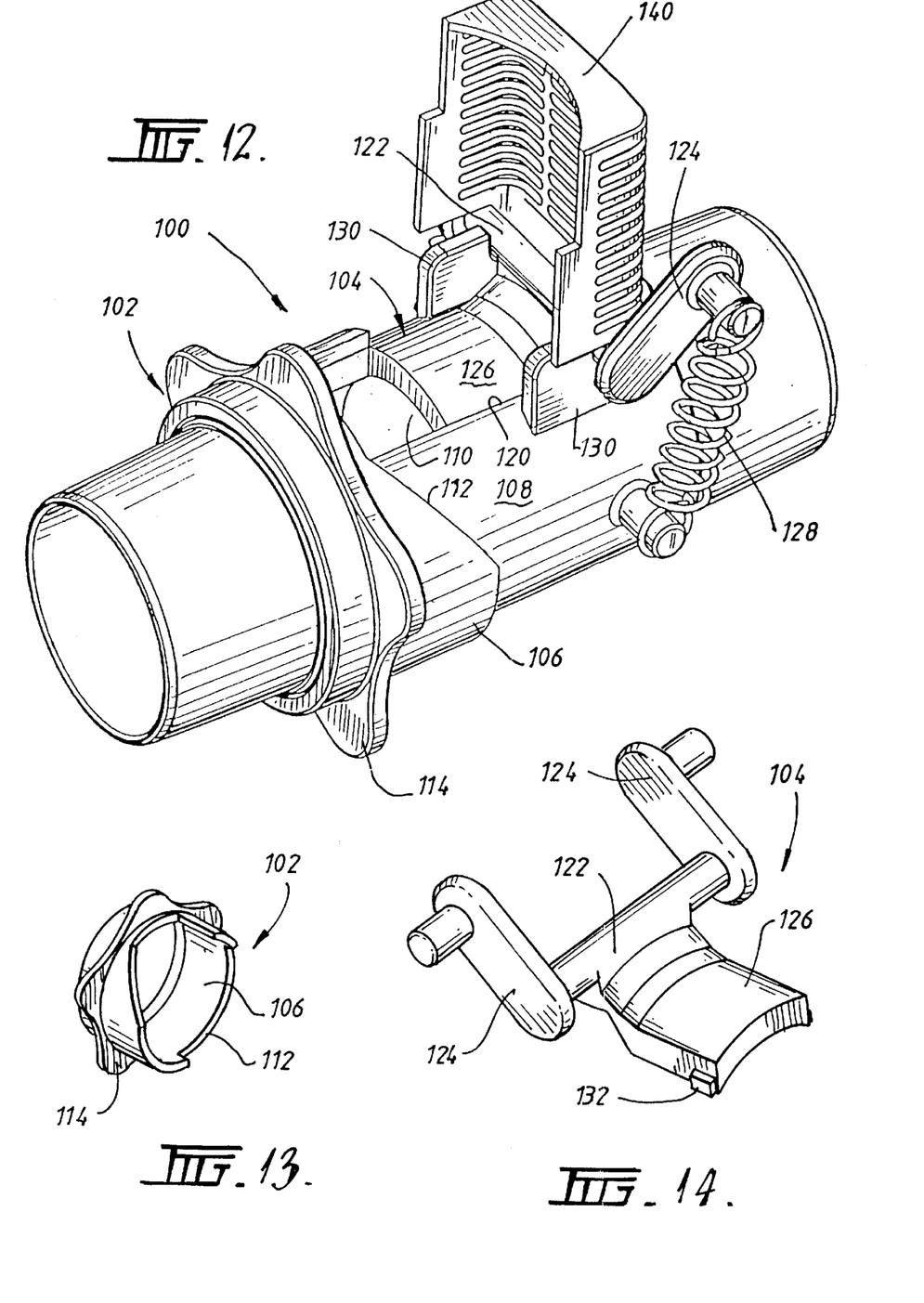
FIG. 12 is an enlarged perspective view of a preferred embodiment of a flow valve assembly for a swimming pool cleaning device.
FIG. 13 illustrates a primary valve of the flow valve of FIG. 12.
FIG. 14 illustrates a secondary valve of the flow valve of FIG. 12.

A flow regulator valve in the skimmer box of the pool can be adjusted to achieve the desired flow rate through the vacuum hose and pool cleaning device 10. FIGS. 12 to 14 illustrate a preferred embodiment of a flow regulator valve assembly 100 in accordance with the present invention. The valve assembly 100 comprises a primary valve 102 which is manually adjustable to set a desired flow rate of water through the pool cleaning device 10, and a secondary valve 104 which automatically opens in the event that the flow of water through the pool cleaning device 10 is obstructed. The flow of water through the pool cleaning device and the water vacuum hose may be obstructed due to blockage such as, for example, may occur if a large obstruction gets sucked up into the throat region 22 of the pool cleaning device 10. In order to prevent cavitation or other possible damage to the water suction pump, it is essential to maintain the flow of water through the pump at all times during operation of the pool cleaning system. Accordingly, the opening of the secondary valve ensures that ambient water can be drawn in to maintain the flow of water through the water suction pump. In this connection, it is important that the flow regulator valve assembly 100 always be located below the water surface. As noted above, preferably the flow regulator valve assembly is located in the skimmer box of the pool at the point where the water vacuum hose is connected to the water suction pump inlet.

As can be seen more clearly in FIG. 13, the primary valve 102 includes a collar 106 which is rotatably mounted on the outer surface of a cylindrical valve body 108 of the valve assembly 100. The valve body 108 has a first aperture 110 which can be fully opened or fully closed by the collar 106, depending on the angular position of the collar 106 relative to the valve body 108. In FIG. 12, the primary valve 102 is shown in a fully open position in which the first aperture 110 is fully opened. A circumferential edge 112 of the collar 106 is shaped so as the permit the first aperture 110 to be partially closed to varying degrees between the fully open and fully closed positions. The primary valve 102 also includes a finger grip 114 in the form of a plurality of lobes which can be easily gripped to permit manual adjustment of the primary valve between the fully open and fully closed positions.

The secondary valve 104 is a pivotally mounted flap valve which is biased to a normally closed position in which it fully closes a second aperture 120 provided in the valve body 108. The flap valve 104 is pivotally mounted about a fulcrum 122 and has a pair of lever arms 124 extending from the fulcrum 122 away from a flap 126 connected to the fulcrum. Each lever arm 124 has a spring 128 connected to a free end thereof to bias the flap 126 to the normally closed position, as shown in FIG. 12. Fulcrum 122 rests in a cradle 130 fixed to the valve body 108 adjacent the second aperture 120. Two small two protrusions 132 on either side of flap 126 engage with the side walls of the second aperture 120 to prevent the flap 120 from pivoting outwards through aperture 120.

In this embodiment, the first and second apertures 110, 120 are adjacent to, and communicate with, each other. Hence, when the secondary valve 104 opens the area of the first aperture 110 is effectively enlarged by the exposed area of the second aperture 120.

Advantageously, the flow regulator valve assembly 100 is also provided with a porous cover 140 for covering the first and second apertures 110, 120 in use. The cover 140 is pivotally connected to the secondary valve 104 by a hinge connection. The cover 140 can pivot between an open position, as shown in FIG. 12, and a closed position in which it covers both the first and second apertures to prevent the ingress of leaves and other debris through the first and second apertures. Cover 140 is provided with a plurality of slots therethrough to allow the unobstructed flow of water through the first and second apertures, but to prevent the ingress of debris and other solid particles above a predetermined size. With cover 140 in the open position as shown in FIG. 12, both the first and second apertures are visible to the user which may be important during manual adjustment of the primary valve as described below.

The purpose of the flow regulator valve assembly 100 is to control the flow of water through the pool cleaning device at a desired water flow rate (liters per minute) which will produce a pulse rate of the flexible valve member in the pool cleaning device of approximately 260–280 beats per minute. An excessive flow water rate will reduce the valve life due to overloading of the flexible valve member. Large swimming pools have more powerful suction pumps which increase the flow rate, and may also have longer water vacuum hoses which has the effect of reducing water flow rate through the pool cleaning device. These variables can be regulated by adjusting the flow regulator valve. With the pool cleaning device connected to the water vacuum hose and submerged in the pool, the flow regulator valve assembly is connected to the water vacuum hose, (with the primary valve closed) and plugged into the skimmer box. The suction pump is then turned on, and the primary valve is slowly opened manually until a slight decrease in pulse rate of the pool cleaning device is observed. With the commencement of water flow and the primary valve closed, the secondary valve will open to allow a predetermined leakage rate (say 300 beats per minute). Opening the primary valve further will decrease the suction in the water vacuum hose, since it acts as a bypass, causing the secondary valve to return to the closed position. The flow regulator valve is now adjusted. If blockage of the pool cleaning device should occur, for example, by a plastic bag caught in the throat region, the secondary valve will open and prevent pump cavitation and damage. The cover 140 provides the following additional benefits when in the closed position:

(a) in a shallow installation, the cover 140 will prevent whirlpooling of the water in the skimmer box between the flow regulator valve and the water surface;

(b) the skimmer box will not require a separate basket for leaves, etc, which is normally contained in the skimmer box; and, (c) if the flow regulator valve is incorrectly installed, for example, with the primary valve fully closed, the cover will prevent blockage of the secondary valve, which is then the only by-pass available.

If the cover is not closed, and the flow regulator valve is otherwise correctly installed, and if an obstruction should occur of the primary valve, the secondary valve can still open to increase the by-pass opening and allow debris to be drawn through the enlarged opening if necessary.

Now that a preferred embodiment of the automatic pool cleaning device in accordance with the invention has been described in detail, several advantages of this device over prior art cleaners will be apparent, including the following:

(i) the valve assembly includes only one moving part, flexible valve member 20, of simple design;

(ii) the shape and configuration of flexible valve member 20 make it low-wearing and thus extend its life significantly;

(iii) the material and arrangement of the valve member 20 provide for quiet and smooth operation;

(iv) the shape and configuration of the cleaning disc 12 provides an effective scrubbing action whilst allowing the formation of sufficient ambient pressure differential to facilitate forwards movement of the device;

(v) the rubber material of the cleaning disc 12 provides soft contact with underwater surfaces and thus avoids damage to the pool;

(vi) the arrangement of the removable hydrofoil section 24 allows accurate control and fine-tuning of the valve action; and, (vii) a judicious choice of the number and placement of deflectors and ballast provides effective balancing and buoyancy for the device.

Numerous variations and modifications will suggest themselves to persons skilled in the pool cleaning arts, in addition to those already described, without departing from the basic inventive concepts. For example, a suitable convex-shaped wall section may be moulded on an inner surface of the tube 14, rather than using a removable hydrofoil section. All such variations and modifications are to be considered within the scope of the present invention, the nature of which is to be determined from the foregoing description and the appended claims.

The claims defining the invention are as follows:

1. An automatic swimming pool cleaning device for use with a water vacuum and filter system, the device comprising:

a flexible cleaning member adapted to contact an underwater surface of the pool;

a tube mechanically coupled to the cleaning member and adapted to be connected to a water vacuum hose wherein water and pool surface contamination will be drawn by suction from underneath said cleaning member through the tube to the water filter system before being returned to the pool; and a flexible valve member mounted proximate a throat region of said tube, wherein said throat ration is provided with a hydrofoil section so that as water flows through the throat region it is accelerated, whereby a decrease in pressure is produced that causes the valve member to flex and move towards the hydrofoil section so as to momentarily interrupt the flow of water, and wherein said flexible valve member is in the form of an elongate strap mounted longitudinally in the throat region of the tube facing said hydrofoil section and lying substantially parallel to the normal flow of water through the tube, said elongate strap being pivotally mounted at one end and fixed at the other end, whereby, in use, a resulting momentary differential of ambient pressure underneath said flexible cleaning member enables the device to move forward along said underwater surface of the pool.

2. An automatic swimming pool cleaning device as defined in claim 1, wherein said elongate strap is mounted with sufficient clearance between the elongate strap and a side wall of the throat region so that debris can bypass the flexible valve member without jamming or becoming stuck within the throat region when the valve member flexes.

3. An automatic swimming pool cleaning device as defined in claim 1, wherein said tube is divided into two sections by a dividing wall so as to form a primary flow chamber and a secondary chamber, and wherein said flexible valve member effectively forms an extension of the dividing wall down to the throat region of the tube.

4. An automatic swimming pool cleaning device as defined in claim 3, wherein most of the water drawn through the tube flows through the primary flow chamber and wherein said momentary interruption of the flow of water caused by the flexing of the valve member produces a decrease in pressure in the secondary chamber due to suction, which causes the valve member to return to an open position.

5. An automatic swimming pool cleaning device as defined in claim 1, wherein said hydrofoil section is removable and is provided with ribs designed to be slidably received in corresponding grooves provided in a wall of the tube.

6. An automatic swimming pool cleaning device as defined in claim 1, wherein said flexible cleaning member is of substantially circular configuration and comprises an inner sole and outer skirt moulded in one piece from a flexible resilient material, and wherein the skirt is of generally thinner cross-section than the sole which allows the cleaning member to provide a continuous drive and soft contact with the underwater pool surface, while at the same time hugging the various contours of the pool.

7. An automatic swimming pool cleaning device as defined in claim 6, wherein said flexible cleaning member has a series of radially extending cavities moulded into the underside of the sole and skirt to allow constantly reduced pressure beneath the cleaning member, and wherein the cavities also enable the skirt to pulsate around the edges generating a scrubbing action on said underwater pool surface.

8. An automatic swimming pool cleaning device for use with a water vacuum and filter system, the device comprising:
    a flexible cleaning member adapted to contact an underwater surface of the pool;
    a tube mechanically coupled to the cleaning member and adapted to be connected to a water vacuum hose wherein water and pool surface contamination will be drawn by suction from underneath said cleaning member through the tube to the water filter system before being returned to the pool; and
    a flexible valve member mounted proximate a throat region of said tube, wherein said throat region is provided with a hydrofoil section which is removable and is provided with ribs designed to be slidably received in corresponding grooves provided in a wall of the tube, so that as water flows through the throat region it is accelerated, whereby a decrease in pressure is produced that causes the valve member to flex and move towards the hydrofoil section so as to momentarily interrupt the flow of water, whereby, in use, a resulting momentary differential of ambient pressure underneath said flexible cleaning member enables the device to move forward along said underwater surface of the pool.

* * * * *